United States Patent

[11] 3,577,915

| [72] | Inventors | Stanley P. Thompson;<br>Don L. Shofer, Bartlesville, Okla. |
|---|---|---|
| [21] | Appl. No. | 821,081 |
| [22] | Filed | May 1, 1969<br>Division of Ser. No. 602,551, Dec. 19, 1966. |
| [45] | Patented | May 11, 1971 |
| [73] | Assignee | Phillips Petroleum Company |

[54] HOT SCREEN PRINTING WITH THERMOPLASTIC INK
5 Claims, No Drawings

| [52] | U.S. Cl. | 101/129, 117/38 |
|---|---|---|
| [51] | Int. Cl. | B41m 1/12 |
| [50] | Field of Search | 101/129; 117/38 |

[56] References Cited

UNITED STATES PATENTS

| 2,682,480 | 6/1954 | Andrews | 117/38 |
|---|---|---|---|
| 3,330,684 | 7/1967 | Wheeler | 117/38 |

FOREIGN PATENTS

| 768,623 | 2/1957 | Great Britain | 101/129 |
|---|---|---|---|

*Primary Examiner*—David Klein
*Attorney*—Young and Quigg

ABSTRACT: A hot screen printing process is disclosed wherein a thermoplastic ink comprising polyethylene, a colorant, and either an ester of rosin or a wax is used at a temperature in the range from about 200—450° F. for screen printing on polyolefin.

HOT SCREEN PRINTING WITH THERMOPLASTIC INK

This is a divisional application of copending application Ser. No. 602,551, filed Dec. 19, 1966, titled THERMOPLASTIC INK.

This invention relates to a method of screen printing using thermoplastic ink.

Various printing operations are of substantial benefit in industrial operations. With respect to various articles of manufacture made from polyolefin, printing is a very significant vehicle for increasing their marketability and usefulness. A tremendous problem is encountered in that conventional inks fail to adhere to the untreated polyolefin surface.

This invention is superior over the prior art in that this invention provides an ink which is suitable for printing on polyolefin surfaces.

In one embodiment, a thermoplastic ink is compounded from a thermoplastic polymer of an olefin, an ester of rosin or wax, and a pigment and applied to a surface by a hot screen printing process.

Accordingly, it is an object of this invention to provide a method of printing using this novel composition of matter.

Other objects, advantages, and features of this invention will be readily apparent to those skilled in the art from the following description and appended claims.

According to this invention, a thermoplastic ink is compounded for use in a hot screen printing process. The compositions of this invention comprise a base, consisting of a thermoplastic polymer of an olefin, compounded with a pigment, or coloring agent, and either a highly stabilized ester of rosin or a wax. In a preferred embodiment, the polymer comprises polyethylene.

The polymeric bases of the composition of this invention comprise polymers of olefins. Specifically, hydrocarbon polymers of an olefin containing less than 4 carbon atoms and possessing proper physical characteristics for use as an ink are satisfactory for the practice of this invention. In one embodiment, polyethylene, having a specific gravity of 0.927 and a melt index of 70, provided excellent results. According to this invention, the polymeric base can comprise about 40 to about 90 weight percent of the composition, when compounded with the ester of rosin, and can comprise about 70 to about 95 weight percent, when compounded with the wax. It is fully within the scope of this invention to add other polymeric materials to the base polymer.

The pigments, or coloring agents, of this invention can comprise any pigment or coloring agent capable of solution in the polymer in the desired proportion and possessing sufficient characteristics of durability and attractiveness as may be demanded by those practicing this invention. In the composition of this invention, the coloring agent can comprise any minor amount. Specifically, the coloring agent of this invention can vary within the range of about 0.001 to about 10 weight percent of the composition.

The esters of rosin suitable for use in this invention comprise highly stabilized esters of rosin. In one embodiment, a highly stabilized pentaerythritol ester of rosin was entirely satisfactory. The amount of the ester of rosin in this invention is within the range of about 10 to about 60 weight percent of the composition. Additionally, it has been found that poor results are achieved when the ratio of the esters of rosin to the polymeric base are substantially higher than 1:1. Ratios substantially above 1:1 cause the ink to remain tacky and/or to become brittle upon cooling.

If desired, wax can replace the ester of rosin in the compositions of this invention. In one embodiment, a Paraflint wax proved entirely satisfactory. In this invention, the wax can vary within the range of about 5 to about 30 weight percent of the composition.

The polymeric compositions of this invention have a viscosity before printing within the range of about 70 to about 250 MI (ASTM 1238–62T). The polymers of this invention will remain in this viscosity range for at least 3 hours.

The polymeric compositions of this invention have a Sward Hardness within the range of about 3 to about 50 after said polymeric composition is placed on the surface by printing and thereby transformed to its solid state.

According to this invention, a method of printing with the particular composition of the invention is provided. According to the method of this invention, the thermoplastic composition of the invention was applied to a polyethylene surface by use of a hot screen technique. The hot screen contains nonporous areas that prevent the ink from going through said screen and porous areas that allow the ink to go through said screen. The porous area then represents the design or letter to be printed. Specifically, this hot screen technique involves placing the ink upon the porous area of a screen, said screen being capable of withstanding temperatures above the melting point of the thermoplastic ink. According to this invention, the screen temperature must be controlled at a temperature that will melt the polymer and produce proper viscosity but not chemically change it. Specifically, a screen temperature range of 275° F. to 350° F. was satisfactory with the polyethylene base previously described. Departure from these temperature ranges by operating below 275° F. will cause the screen to "plug" and thereby terminate the printing operation. Departure from these ranges by operating above 350° F. will cause a chemical change in the polymers rendering the polymers unusable as an ink base. The remaining porous area of the screen, containing the design or characters to be printed, then is capable of permitting the thermoplastic ink to pass therethrough onto the surface to which the screen is in contact. According to this invention, the surface to which the ink is to be applied is maintained, and held for a sufficient time for good printing results, at a level substantially below that of the melting point of the thermoplastic ink and, as a consequence, the ink solidifies immediately upon contact with the surface. Mechanical means can be used to aid the thermoplastic ink in flowing through the porous portion of the screen. Such mechanical means can comprise any means capable of forcing ink through the porous area and not interfering with other steps in the printing operation. Rollers, squeegees, and the like, are entirely satisfactory for the practice of this invention. According to this invention, only a very thin or "printing film" is left on the surface to be printed. The printed surface is then removed from the screen and another blank surface to be printed is placed in contact with the screen and the cycle is repeated.

The ink must remain at a temperature above that of its melting point for the duration of the printing operation in order to possess sufficient viscosity characteristics to flow properly through the porous portions of the screen. An additional consideration is that at increased temperatures crosslinking of the polymer chains is likely to occur. As a result, it is possible to operate at higher temperatures when a coarser screen is used because the increased crosslinking is less likely to cause "plugging" of the screen. The compositions of this invention can be maintained within the range of about 200° F. to about 400° F. when the screen size is 180 mesh or finer. When the screen size is coarser than 180 mesh, a temperature within the range of about 200° F. to about 450° F. can be used. As explained above, higher operating temperatures are possible with a coarser screen because there is less likelihood of plugging the screen. In one embodiment, a 180 mesh screen printed well at 275° F. with the polyethylene base previously described.

The temperature range must, however, be maintained with the above recited ranges in order that the viscosity of the ink be maintained in the range of about 70 to about 250 MI (ASTM 1238–62T). Viscosities above 250 MI produce poor printing because the ink flows too freely. Viscosities below 70 MI also produce poor quality printing as the ink is not sufficiently thin to flow through the porous portion of the screen.

According to this invention, the polymeric compositions of this invention possess a pot life of at least 3 hours. That is, they will demonstrate no substantial viscosity change within 3 hours after assuming a liquid state. The printing operation, therefore, enjoys the advantage that the printing operation can consume any period of time up to 3 hours.

As has been previously recited, the thermoplastic ink of this composition will possess a Sward Hardness within the range of about 3 to about 50 after said thermoplastic ink is placed on the surface being printed.

polyethylene and pigment. This is unsatisfactory in that the composition becomes rubbery and unworkable after 15 minutes. The necessity of the ester or wax is thereby demonstrated.

TABLE I

| Run No. | Ethylene polymer base (percent) | Pentaerythritol ester of rosin (percent) | Pigment (percent) | Wax (percent) | Remarks |
|---|---|---|---|---|---|
| 1 | 49 | 49 | 2 | | Very good results. |
| 2 | 50 | 50 | | | Very good results through 180 mesh screen at 275° F. |
| 3 | 88 | | 2 | 10 | Good adhesion, fair print. |
| 4 | 78 | | 2 | 20 | Good adhesion, slightly harder than Run 3. |
| 5 | 78 | 20 | 2 | | Good adhesion, fair print with 180 mesh screen at 300° F.—10 good prints—second best formulation. |
| 6 | 47 | 47 | 6 | | Good adhesion, printed at 275° F. with 180 mesh screen—excellent prints, continuous printing could be made—best formulation. |
| 7 | 58 | | 2 | 40 | Poor quality prints—no adhesion. |
| 8 | 98 | | 2 | | Poor results—became rubbery after 15 minutes at operating temperature. |

This invention is thus broadly applicable to compositions comprising a thermoplastic polymer and a coloring agent, as well as a method of printing using said compositions.

Various modifications of this invention can be made in view of the foregoing disclosure and the appended claims without departing from the spirit or scope thereof.

Runs were conducted using various formulations to qualitatively identify formulations that are satisfactory. Table I represents a tabulation of these runs.

Reference to Table I clearly indicates certain formulations are satisfactory while others are not. Runs 1, 5, and 6 indicate a formulation consisting of polyethylene base, pentaerythritol ester of rosin and pigment. This formulation works well in ranges of about 1 part polyethylene to about 1 part ester of rosin (runs 1 and 6) and the range can be as high as about 80 percent polyethylene and about 20 percent ester of rosin (Run 5) for satisfactory results. Run 2 indicates only an ethylene and ester of rosin formulation with no pigment. This run shows that the existence of pigment is not essential for a successful formulation. A successful formulation depends then on ingredients other than the pigment. Additionally, the operability of an approximate 1:1 ratio of polymer and base is demonstrated. Runs 3, 4 and 7 indicate a composition consisting of polyethylene, pigment, and wax. These runs indicate that ranges of about 10 to about 20 percent wax produces a good print, but as much as about 40 percent renders the formulation unsatisfactory. These runs also indicate the necessity of the wax, together with the polyethylene, for good printing results. Run 8 indicates a composition consisting of polyethylene and pigment. This is unsatisfactory in that the composition becomes rubbery and unworkable after 15 minutes. The necessity of the ester or wax is thereby demonstrated.

We claim:

1. A method of hot screen printing comprising the steps of placing a screen having both porous and nonporous portions within a processing zone; placing a surface capable of being printed thereon in contact with the porous portion of said screen, wherein the temperature of said surface is substantially below the melting point of a thermoplastic ink; placing a thermoplastic ink comprising from 90 to 40 weight percent of polyethylene, a minor amount of a coloring agent, and from 10 to 60 weight percent of a stabilized ester of rosin on said porous portion of said screen; generating a sufficient temperature within said processing zone to maintain the temperature of said screen in the range of 275° to 350° F. and the ink viscosity in the range of about 70 to about 250 MI as measured by ASTM Standard 1238–62T; and forcing said ink through at least a portion of said porous portion of said screen in such a manner that only a printing film is placed on said surface.

2. The method of claim 1 wherein said stabilized ester of rosin comprises a stabilized pentaerythritol ester of rosin.

3. The method of claim 1 wherein said thermoplastic ink possesses a Sward Hardness within the range of about 3 to about 50 in its solid state.

4. The method of claim 1 wherein said surface capable of being printed thereon is a polyolefinic material.

5. The method of claim 4 wherein said surface capable of being printed thereon is polyethylene.

UNITED STATES PATENT OFFICE

CERTIFICATE OF CORRECTION

Patent No. 3,577,915                                          Dated May 11, 1971

Stanley P. Thompson and Don L. Shofner

It is certified that error appears in the above-identified patent and that said Letters Patent are hereby corrected as shown below:

On the cover page of patent, the patentee "Don L. Shofer" should read —— Don L. Shofner ——; column 4, line 39, the numeral "1" should read —— 3 ——.

Signed and sealed this 7th day of September 1971.

(SEAL)
Attest:

EDWARD M. FLETCHER, JR.
Attesting Officer

ROBERT GOTTSCHALK
Acting Commissioner of Patents